(12) United States Patent
Gehring et al.

(10) Patent No.: US 11,150,055 B2
(45) Date of Patent: Oct. 19, 2021

(54) ACCESSORY MOUNTING DEVICE AND SYSTEM USING SAME

(71) Applicant: Avon Rubber P.L.C., Melksham (GB)

(72) Inventors: Thomas R. Gehring, Mahtomedi, MN (US); Vasilios Brachos, North Andover, MA (US); Kayla A. McGrath, Cottage Grove, MN (US); Evan L. Breedlove, Woodbury, MN (US)

(73) Assignee: Avon Protection Ceradyne LLC, Irvine, CA (US)

( * ) Notice: Subject to any disclaimer, the term of this patent is extended or adjusted under 35 U.S.C. 154(b) by 799 days.

(21) Appl. No.: 15/767,051

(22) PCT Filed: Oct. 4, 2016

(86) PCT No.: PCT/US2016/055348
§ 371 (c)(1),
(2) Date: Apr. 9, 2018

(87) PCT Pub. No.: WO2017/062368
PCT Pub. Date: Apr. 13, 2017

(65) Prior Publication Data
US 2018/0292178 A1 Oct. 11, 2018

Related U.S. Application Data

(60) Provisional application No. 62/239,497, filed on Oct. 9, 2015.

(51) Int. Cl.
*A42B 3/04* (2006.01)
*F41H 1/04* (2006.01)
*F41G 11/00* (2006.01)

(52) U.S. Cl.
CPC ............. *F41H 1/04* (2013.01); *A42B 3/04* (2013.01); *A42B 3/0406* (2013.01); *F41G 11/003* (2013.01); *F16B 2200/30* (2018.08)

(58) Field of Classification Search
CPC ......... A42B 3/04; A42B 3/044; A42B 3/0446; Y10T 403/32451; F41H 1/04; F16B 2200/30; F41G 11/003; F41C 27/00
See application file for complete search history.

(56) References Cited

U.S. PATENT DOCUMENTS

| | | | |
|---|---|---|---|
| 5,142,806 A | 9/1992 | Swan | |
| 7,805,776 B2 * | 10/2010 | Crossman | A42B 3/20 2/424 |

(Continued)

FOREIGN PATENT DOCUMENTS

GB     2088199 A  *  6/1982  ............. F16M 13/02

OTHER PUBLICATIONS

Picatinny adapter—Ops Core—Manufacturers, Feb. 6, 2013, URL:https://web.archive.org/web/20130206024736/http://www.elitedefense.com/manufacturers/ops-core/picatinny-adapter.html.

(Continued)

*Primary Examiner* — Michael P Ferguson
(74) *Attorney, Agent, or Firm* — McGarry Bair PC

(57) ABSTRACT

Various embodiments of an accessory mounting device are disclosed. The device can be adapted to engage an elongated rail. The device can include a body having top, bottom, and first and second side surfaces. Each of the side surfaces can include a rail engagement portion adjacent the bottom surface of the body and an accessory engagement portion adjacent the top surface. The device can also include a locking mechanism including a lever connected to the body at a pivot, and a tab extending from the lever in a direction away from the bottom surface. In one or more embodiments, the locking mechanism can include first and second levers each connected to the body at a pivot. The lever can rotate about a pivot axis in a direction toward the top surface of the (Continued)

body when the locking mechanism is manipulated from a locked position to an unlocked position.

14 Claims, 7 Drawing Sheets

(56) References Cited

U.S. PATENT DOCUMENTS

| | | | |
|---|---|---|---|
| 7,816,888 B2* | 10/2010 | Rejman | H01M 50/20 |
| | | | 320/114 |
| 7,849,517 B2 | 12/2010 | Rogers et al. | |
| 7,908,667 B2 | 3/2011 | Rogers et al. | |
| 8,276,307 B2 | 10/2012 | Deros | |
| 8,857,097 B2 | 10/2014 | Rorick | |
| 8,959,825 B2 | 2/2015 | Goertzen | |
| 9,404,714 B2* | 8/2016 | Langevin | F41A 3/66 |
| 10,101,126 B2* | 10/2018 | Sharron | F41G 11/003 |
| 2011/0113519 A1 | 5/2011 | Gendron et al. | |
| 2012/0011631 A1 | 1/2012 | Crossman et al. | |
| 2012/0180202 A1 | 7/2012 | Mcneal | |

OTHER PUBLICATIONS

Wikipedia contributors. "Picatinny rail." Wikipedia, The Free Encyclopedia. Wikipedia, The Free Encyclopedia, Jul. 6, 2015. Web. Jul. 21, 2015, retrieved from the internet Dec. 13, 2019.
"Ops-Core Picatinny Adapter" http://www.amazon.com/Ops-Core-Ops-Core-Picatinny-Adapter/dp/B006JPJHDQ. 6 pages, retrieved from the internet Dec. 13, 2019.
http://www.bing.com/imaqes/search?g=ops+core+picatinny+adapter&view=detail2&&id=34D67F9A630B1E361E4C2B40385542D59D0D9F9&selectedIndex=0&ccid=6MEgY6mi&simid=608040024053451687&thid=OIP.ME8c12063a9a2754bf4bb2af31c9fb3bbo0&ajaxhist=0.
International Search Report for PCT International Application No. PCT/US2016/055348, dated Nov. 21, 2016, 5 pages.

* cited by examiner

# ACCESSORY MOUNTING DEVICE AND SYSTEM USING SAME

CROSS REFERENCE TO RELATED APPLICATIONS

This application is a national stage filing under 35 U.S.C. 371 of PCT/US2016/055348, filed Oct. 4, 2016, which claims the benefit of Provisional Application No. 62/239,497, filed Oct. 9, 2015, the disclosure of which is incorporated by reference in their entirety herein.

BACKGROUND

Head gear such as helmets utilized, e.g., in military and police applications have been developed that support one or more accessories such as flashlights or cameras. These accessories can assist the wearer in performing various tasks. For example, flashlights can be utilized to allow the wearer to more easily see the immediate surroundings Frequently, the position of the flashlight or other accessory may need to be adjusted, or the accessory may need to be removed and replaced with another accessory. Further, two or more accessories may need to be utilized concurrently. When no accessories are required, the weight of the head gear can be reduced by removing such accessories.

To more easily attach and remove accessories from head gear, various mounting systems have been developed that can be connected to head gear. Such systems often include a rail or groove within which a mount attached to an accessory can be disposed. The rail can allow a wearer to adjust the accessory relative to the head gear. Such rails, however, can require the wearer use one or more tools to reposition the accessory. Further, at least some of these rails do not allow a wearer to reposition the accessory with a single hand, oftentimes requiring that the user remove the head gear to adjust the accessory.

SUMMARY

In general, the present disclosure provides various embodiments of an accessory mounting device and a system utilizing such device. In one or more embodiments, the device can be adapted to engage an elongated rail. The device can further be adapted to connect one or more accessories to the elongated rail. The device can include a body extending along a body axis between first and second end surfaces, a top surface, a bottom surface, and first and second side surfaces. At least one of the first and second side surfaces can include a rail engagement portion and an accessory engagement portion. The rail engagement portion can be adapted to engage an overhang portion of an elongated rail. Further, the accessory engagement portion can be adapted to engage an accessory such that the accessory can be attached to the body of the device. In one or more embodiments, the accessory mounting device can also include a locking mechanism that includes a lever connected to the body of the device at a pivot. In one or more embodiments, the lever can be a resilient lever. Further, in one or more embodiments, the locking mechanism can include two or more levers connected to the body of the device at one or more additional pivots. The lever can extend from the pivot beyond one of the first and second end surfaces of the body. The lever can also rotate about a pivot axis that intersects the pivot such that the lever rotates toward the top surface of the body when the locking mechanism is manipulated from a locked position to an unlocked position.

In one aspect, the present disclosure provides an accessory mounting device adapted to engage an elongated rail. The device includes a body extending along a body axis between first and second end surfaces, where the body further includes a top surface, a bottom surface, and first and second side surfaces each extending between the top and bottom surfaces and along the body axis. The top surface includes two ridges separated by a slot. Each of the first and second side surfaces includes a rail engagement portion adjacent the bottom surface and extending along the body axis. And each of the first and second side surfaces further includes an accessory engagement portion adjacent the top surface and extending along the body axis. The accessory mounting device further includes a locking mechanism that includes a resilient lever connected to the body at a pivot and a tab extending from the lever in a direction away from the bottom surface of the body, where the lever includes an actuation portion disposed adjacent the first end surface of the body. The lever rotates about a pivot axis that intersects the pivot and is substantially orthogonal to the body axis and substantially parallel to the top surface. The lever is biased in a direction away from the top surface and rotates toward the top surface when the locking mechanism is manipulated from a locked position to an unlocked position.

In another aspect, the present disclosure provides an accessory mounting device adapted to engage an elongated rail. The accessory mounting device includes a body extending along a body axis between first and second end surfaces, where the body further includes a top surface, a bottom surface, and first and second side surfaces each extending between the top and bottom surfaces and along the body axis. Each of the first and second side surfaces includes a rail engagement portion adjacent the bottom surface and extending along the body axis. Each of the first and second side surfaces further includes an accessory engagement portion adjacent the top surface and extending along the body axis, where at least the top surface is adapted to be connected to an accessory. The accessory mounting device further includes a locking mechanism that includes first and second levers connected to the body at first and second pivots, a first tab extending from the first lever in a direction away from the bottom surface of the body, and a second tab extending from the second lever in a direction away from the bottom surface of the body. The first lever extends from the first pivot beyond the first end surface of the body. The second lever extends from the second pivot beyond the second end surface of the body. Each of the first and second levers rotates about a pivot axis that intersects the first and second pivots respectively and is substantially orthogonal to the body axis and substantially parallel to the top surface. Further, each of the first and second levers rotates toward the top surface of the body when the locking mechanism is manipulated from a locked position to an unlocked position.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
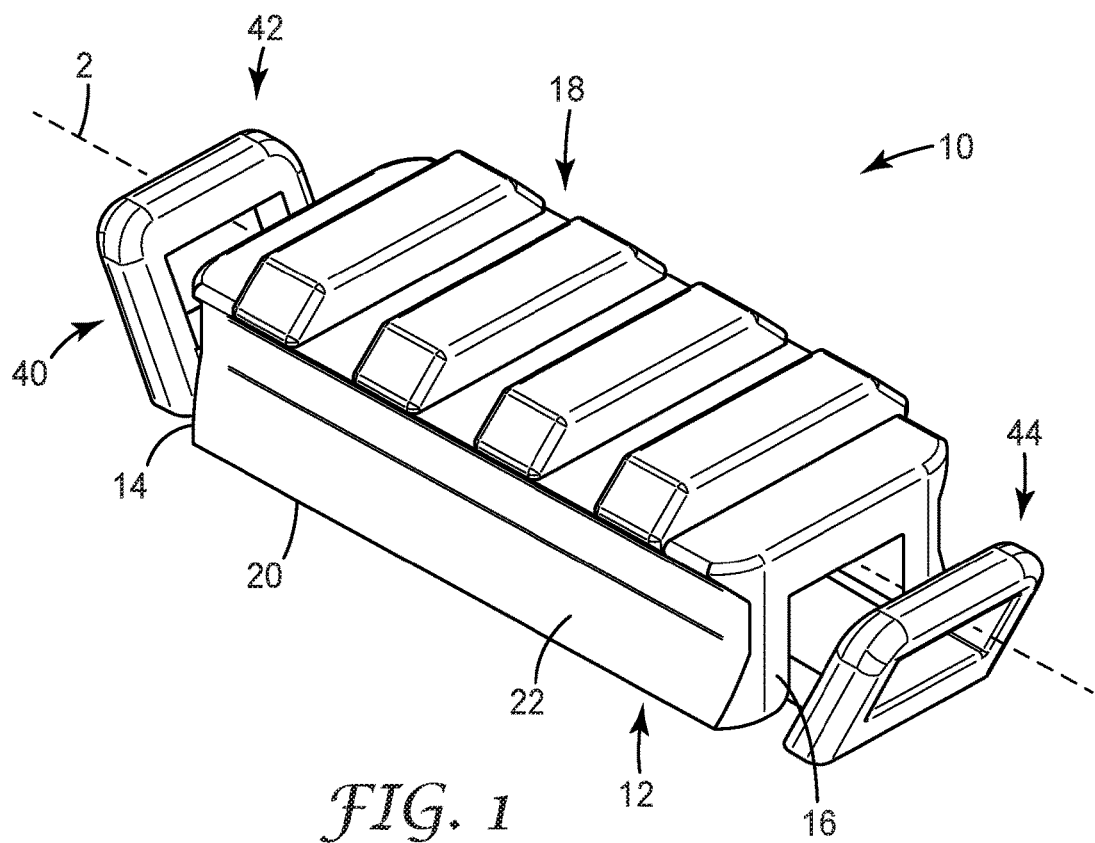
FIG. 1 is a schematic perspective view of one embodiment of an accessory mounting device.

In general, the present disclosure provides various embodiments of an accessory mounting device and a system utilizing such device. In one or more embodiments, the device can be adapted to engage an elongated rail. The device can further be adapted to connect one or more accessories to the elongated rail. The device can include a body extending along a body axis between first and second end surfaces, a top surface, a bottom surface, and first and second side surfaces. At least one of the first and second side surfaces can include a rail engagement portion and an accessory engagement portion. The rail engagement portion can be adapted to engage an overhang portion of an elongated rail. Further, the accessory engagement portion can be adapted to engage an accessory such that the accessory can be attached to the body of the device. In one or more embodiments, the accessory mounting device can also include a locking mechanism that includes a lever connected to the body of the device at a pivot. In one or more embodiments, the lever can be a resilient lever. Further, in one or more embodiments, the locking mechanism can include two or more levers connected to the body of the device at one or more additional pivots. The lever can extend from the pivot beyond one of the first and second end surfaces of the body. The lever can also rotate about a pivot axis that intersects the pivot such that the lever rotates toward the top surface of the body when the locking mechanism is manipulated from a locked position to an unlocked position.

One or more embodiments of accessory mounting devices described herein can connect one or more accessories that include various connection interfaces to an accessory rail on a helmet or other head gear. Further, one or more embodiments of accessory mounting devices described herein can allow a wearer to mount one or more accessories to an accessory or elongated rail on a helmet without the use of one or more tools such as a screwdriver or wrench. In some currently available designs, a wearer may be required to remove a helmet from the wearer's head and use a tool to release a mounting device from a rail on the helmet such that the wearer can change mounted accessories. Further, one or more embodiments of accessory mounting devices described herein can allow a wearer to attach and detach an accessory to a helmet accessory rail using a single hand.

The various accessory mounting devices described herein can be utilized to attach an accessory to a helmet utilizing any suitable connection interface. For example, in one or more embodiments, the accessory mounting device can include a Picatinny rail or tactical rail that is adapted to receive a Picatinny mount connected to an accessory. In general, a Picatinny rail, also known as a MIL-STD-1913 rail, Standardization Agreement 2324 rail, or tactical rail, is a bracket that includes a series of ridges with a T-shaped cross-section interspersed with flat spacing slots. Accessories can be mounted onto the rail, e.g., by sliding them on from one end or the other; by means of a Weaver mount that is clamped to the rail; or by connecting the accessory to the slots between the raised sections. Each slot can have a width of 0.206 in (5.23 mm). Further, the slots can have a center-to-center spacing of 0.394 in (10.01 mm), and a slot depth of 0.118 in (3.00 mm). See MIL-STD-1913 (1995), "Dimensioning of Accessory Mounting Rail for Small Arms Weapons." Further, one or more embodiments of accessory mounting devices described herein can allow connection of standard devices and accessories that are connected to Picatinny mounts to be attached to an accessory rail on a combat helmet or other type of head gear. Any suitable accessories can be connected to a rail utilizing one or more embodiments of accessory mounting devices described herein, e.g., flashlights, cameras, gun sights, night vision goggles, protective face shields, etc.

Figure 2:
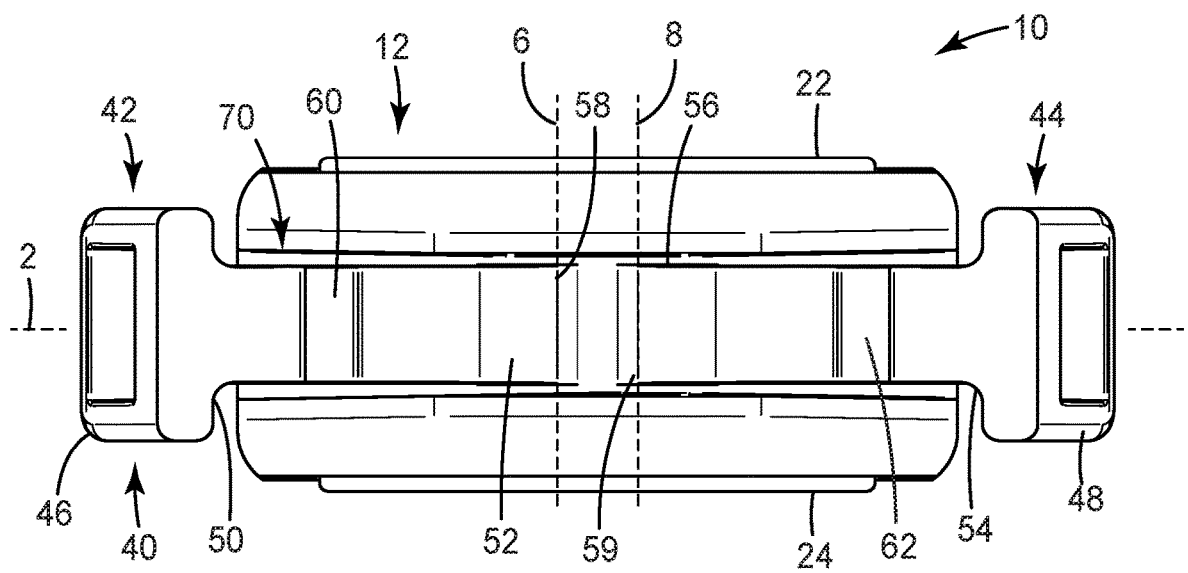
FIG. 2 is a schematic bottom plan view of the accessory mounting device of FIG. 1
Figure 3:
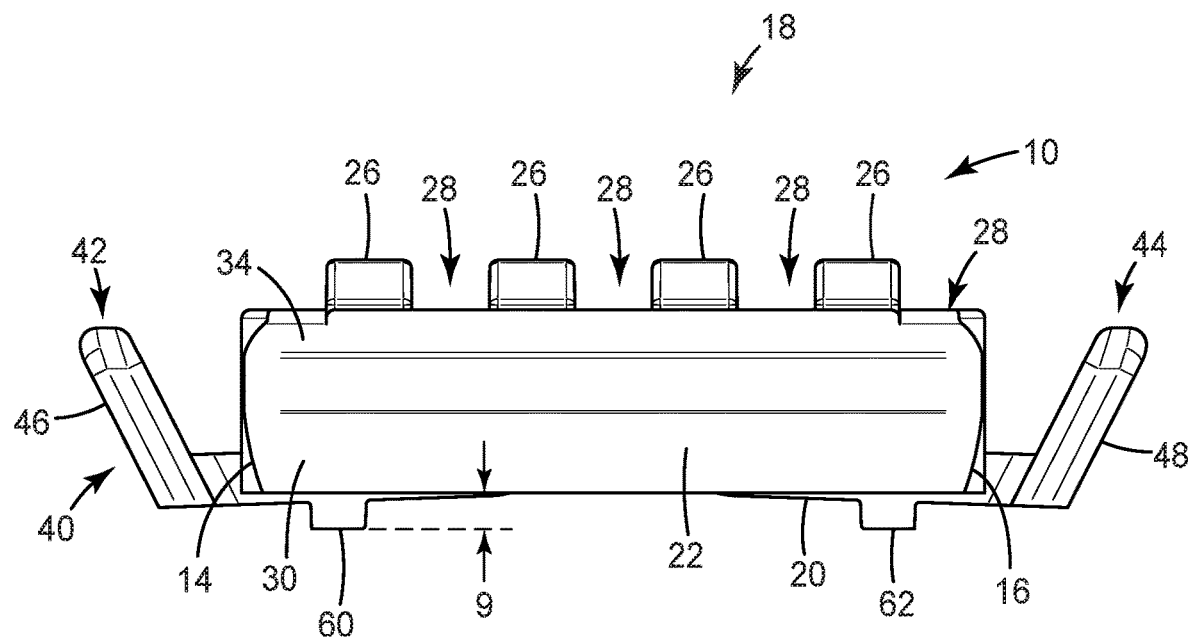
FIG. 3 is a schematic side view of the accessory mounting device of FIG. 1 with a locking mechanism of the device in a locked position.
Figure 4:
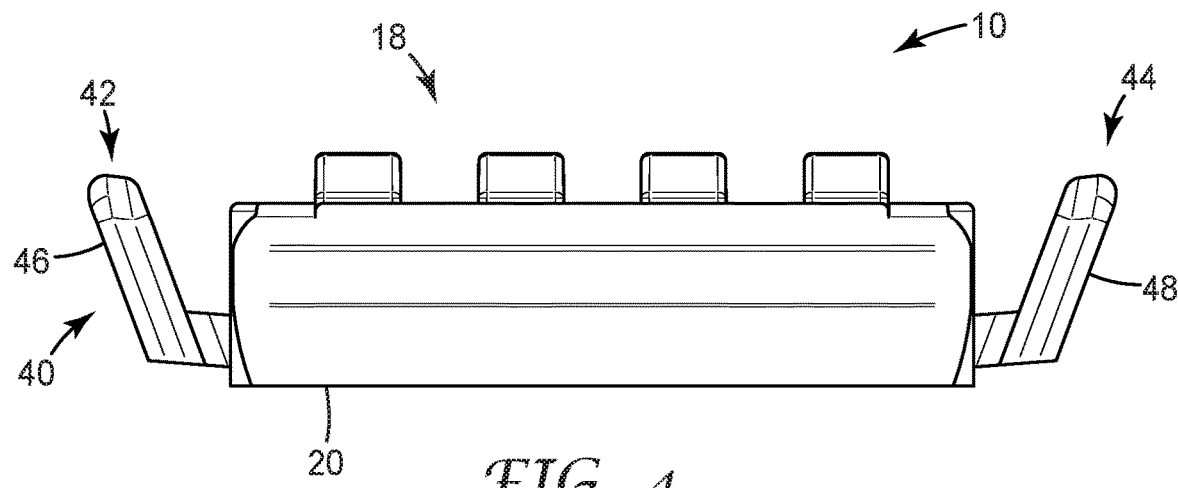
FIG. 4 is a schematic side view of the accessory mounting device of FIG. 1 with a locking mechanism of the device in an unlocked position.

FIGS. 1-4 are various views of one embodiment of an accessory mounting device 10. The device 10 can be adapted to engage an elongated rail and connect an accessory or accessories to the elongated rail as is further described herein. The device 10 can include a body 12 that extends along a body axis 2 between a first end surface 14 and a second end surface 16. The body 12 can also include a top surface 18, a bottom surface 20, and first and second side surfaces 22, 24. Further, the device 10 can also include a locking mechanism 40 that includes a first lever 42 connected to the body 12 at a pivot 58 (FIG. 2), and a tab 60 that extends from the lever in a direction away from the bottom surface 20 of the body. In one or more embodiments, the locking mechanism 40 can also include a second lever 44 that is connected to the body 12 at a second pivot 59 (FIG. 2), and a second tab 62 that extends from the second lever in a direction away from the bottom surface 20 of the body 12. In one or more embodiments, one or both of the levers 42, 44 can rotate toward the top surface 20 of the body 12 when the locking mechanism 40 is manipulated from a locked position (as shown in FIG. 3) to an unlocked position (as shown in FIG. 4).

The body 12 can take any suitable shape or combination of shapes and have any suitable dimensions. Further, the body 12 can include any suitable material or combination of materials, e.g., metal (e.g., aluminum, brass, stainless steel), polymeric (e.g., polycarbonate, nylon, ABS), etc. The body 12 can be a unitary body made from a single piece of material using any suitable technique or combination of techniques, e.g., injection molding, additive manufacturing (e.g., 3D printing such as fusion deposition modeling and stereo lithography), and subtractive manufacturing (e.g., machining) In one or more embodiments, the body 12 can include two or more separate pieces that are connected together using any suitable technique or combination of techniques, e.g., bonding, adhering, mechanically attaching, etc.

The body 12 extends along the body axis 2 between the first and second end surfaces 14, 16. These end surfaces 14, 16 can take any suitable shape or combination of shapes and have any suitable dimensions. The top surface 18 and the bottom surface 20 of the body 12 can also take any suitable shape or combination of shapes and have any suitable dimensions. In the embodiment illustrated in FIGS. 1-4, the top surface 18 includes two or more ridges 26 separated by slots 28. The ridges 26 can take any suitable shape or combination of shapes and have any suitable dimensions. Further, the slots 28 can take any suitable shape or combination of shapes and have any suitable dimensions. In one or more embodiments, the ridges 26 and slots 28 may be adapted to receive a Picatinny rail or mount.

Further, the bottom surface 20 can include a recess 70 (FIG. 2) that extends between the first and second end surfaces 14, 16 along the body axis 2. The recess 70 can take any suitable shape or combination of shapes and have any suitable dimensions. In one or more embodiments, the recess 70 can have a width in a direction orthogonal to the body axis 2 that is greater than a width of one or both of the levers 42, 44, which can be disposed at least partially within the recess as is further described herein.

Figure 7:
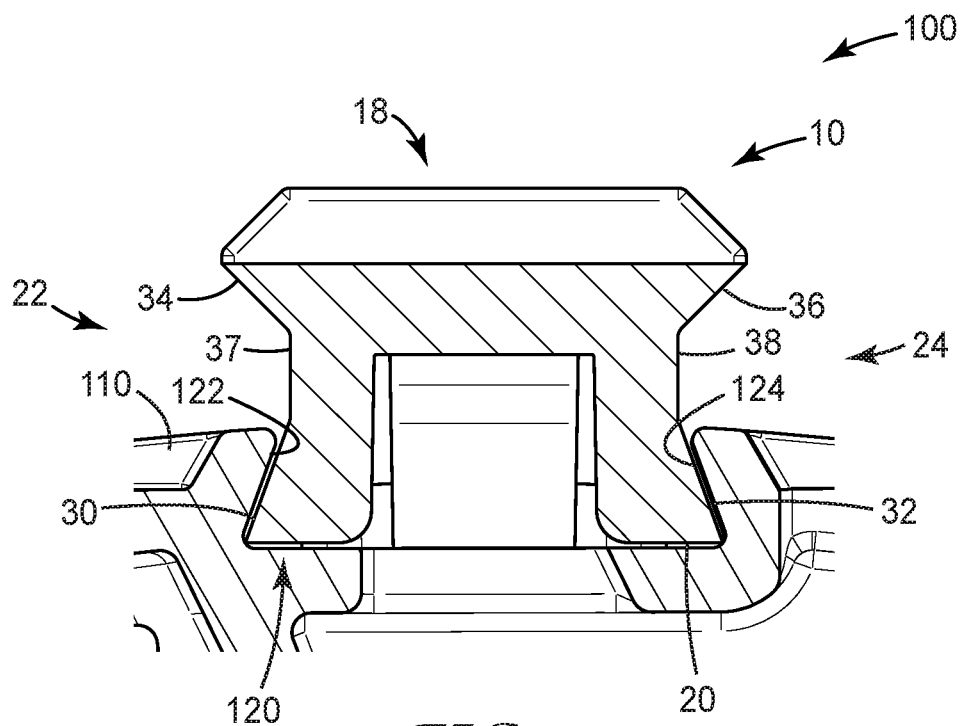
FIG. 7 is a schematic end cross-section view of the accessory mounting system of FIG. 6.

The body 12 also includes the first and second side surfaces 22, 24 that each extends between the top and bottom surfaces 18, 20 along the body axis 2. The first and second side surfaces 22, 24 can take any suitable shape or combination of shapes and have any suitable dimensions. As shown in FIG. 7, which is a schematic cross-section view of an accessory mounting system 100 that includes the accessory mounting device 10 of FIGS. 1-4, the first side surface 22 can include a rail engagement portion 30 and an accessory engagement portion 34. Further, the second side surface 24 can include a rail engagement portion 32 and an accessory engagement portion 36. The rail engagement portions 30, 32 can be disposed in any suitable location on the first and second side surfaces 22, 24. In one or more embodiments, each of the rail engagement portions 30, 32 are disposed adjacent the bottom surface 20 of the body 12 and extend along the body axis 2. As used herein, the phrase "adjacent the bottom surface" means that an element or component is disposed closer to the bottom surface of the body than to the top surface of the body.

Further, the accessory engagement portions 34, 36 of the first and second side surfaces 22, 24 can be disposed in any suitable location on the first and second side surfaces. In one or more embodiments, the accessory engagement portions 34, 36 are disposed adjacent the top surface 18 of the body and extend along the body axis 2. As used herein, the phrase "adjacent the top surface" means that an element or component is disposed closer to the top surface of the body than to the bottom surface of the body.

The rail engagement portions 30, 32 can take any suitable shape or combination of shapes. The rail engagement portions 30, 32 can be shaped such that they engage overhang portions 122, 124 of rail 110 as shown in FIG. 7 and further described herein. As shown in FIG. 7, each of the rail engagement portions 30, 32 includes a tapered portion that extends from the bottom surface 20 of the body 12 to center portions 37, 38 of the first and second side surfaces 22, 24 respectively. While depicted as being disposed on first and second side surfaces 22, 24, in one or more embodiments, one or more portions of the rail engagement portions 30, 32 can also be disposed on the bottom surface 20 of the body 12.

Further, the accessory engagement portions 34, 36 of the first and second side surfaces 22, 24 can take any suitable shape or combination of shapes. In one or more embodiments, the accessory engagement portions 34, 36 can be shaped to receive an accessory mounted to the device 10. For example, in one or more embodiments, the top surface 18 and one or both of the accessory engagement portions 34, 36 of the side surfaces 22, 24 can together form a Picatinny rail that is adapted to accept a Picatinny mount of an accessory. In the illustrated embodiment, each of the accessory engagement portions 34, 36 have a tapered shape that extends from the top surface 18 to the center portions 37, 38 of the first and second side surfaces 22, 24 respectively. Although depicted as being disposed on the first and second side surfaces 22, 24, in one or more embodiments, one or more portions of the accessory engagement portions 34, 36 can also be disposed on the top surface 18 of the body 12.

The center portions 37, 38 of the first and second side surfaces 22, 24 can also take any suitable shape or combination of shapes. As shown, the center portions 37, 38 are substantially flat portions that extend along the body axis 2 and form planes that are parallel to the body axis and orthogonal to one or both of the top and bottom surfaces 18, 20. In one or more embodiments, the rail engagement portions 30, 32 can meet or intersect with the accessory engagement portion 34, 36 such that the center portions 37, 38 form a part of one or both of the rail engagement portions and the side engagement portions. For example, in one or more embodiments, the tapered rail engagement portions 30, 32 can be adapted such that they intersect the tapered accessory engagement portions 34, 36, where the flat surfaces of the center portions 37, 38 that are shown in FIG. 7 are no longer present.

The device 10 also includes the locking mechanism 40. The locking mechanism 40 can include any suitable locking mechanism that is adapted to engage an accessory rail (e.g., elongated rail 110 of FIGS. 6-8) and lock the device 10 in position relative to the rail. The locking mechanism 40 includes first lever 42 and second lever 44. Although depicted as including two levers 42, 44, the locking mechanism 40 can include any suitable number of levers, e.g., one, two, three, four, five or more levers. The levers 42, 44 can take any suitable shape or combination of shapes and have any suitable dimensions. Further, the levers 42, 44 can include any suitable material or combination materials, e.g., the same materials described above regarding the body 12. In one or more embodiments, one or both of the levers 42, 44 can include a resilient or flexible material. In one or more embodiments, one or both of the levers 42, 44 can include the same material or materials utilized to form the body 12 of device 10.

In one or more embodiments, the locking mechanism 40 can be integral with the body 10. As used herein, the term "integral" means that two or more elements are manufactured together at the same time; that is, they are made together as one part and not two or more separately manufactured parts that are subsequently joined together. In one or more embodiments, one or both of the levers 42, 44 can be made separately and attached to the body 12 at pivots 58, 59.

First lever 42 can include an actuation portion 46 at a first end 50 (FIG. 2) of the lever that is adapted to be engaged by a user when manipulating the locking mechanism 40 between the locked position (FIG. 3) and the unlocked position (FIG. 4) as is further described herein. Similarly, the second lever 44 includes an actuation portion 48 at a first end 54 (FIG. 2) of the second lever that is adapted to be engaged by a user when manipulating the locking mechanism 40 between the locked position and the unlocked position. The actuation portions 46, 48 can be integral with the respective lever 42, 44 or a separate portion that can be attached to the lever using any suitable technique or combination of techniques. Further, the actuation portions 46, 48 can take any suitable shape or combination of shapes and have any suitable dimensions. As illustrated in FIG. 3, the actuation portions 46, 48 each angle in a direction away from the body 12 of the device 10 such that a user can grasp the device with a single hand and place, e.g., the thumb of the hand on one actuation portion and a finger on the other actuation portion, and press the levers 42, 44 toward the body, e.g., in a squeezing motion, thereby manipulating the locking mechanism 40 between the locked position and the unlocked position. Although depicted as each angling in a direction away from the body 12, the actuation portions 46, 48 can be disposed in any suitable relationship relative to the body, e.g., one or both of the actuation portions can extend in a direction substantially orthogonal to the body axis 2 such that they are substantially parallel to the first and second end surfaces 14, 16 respectively.

Figure 6:
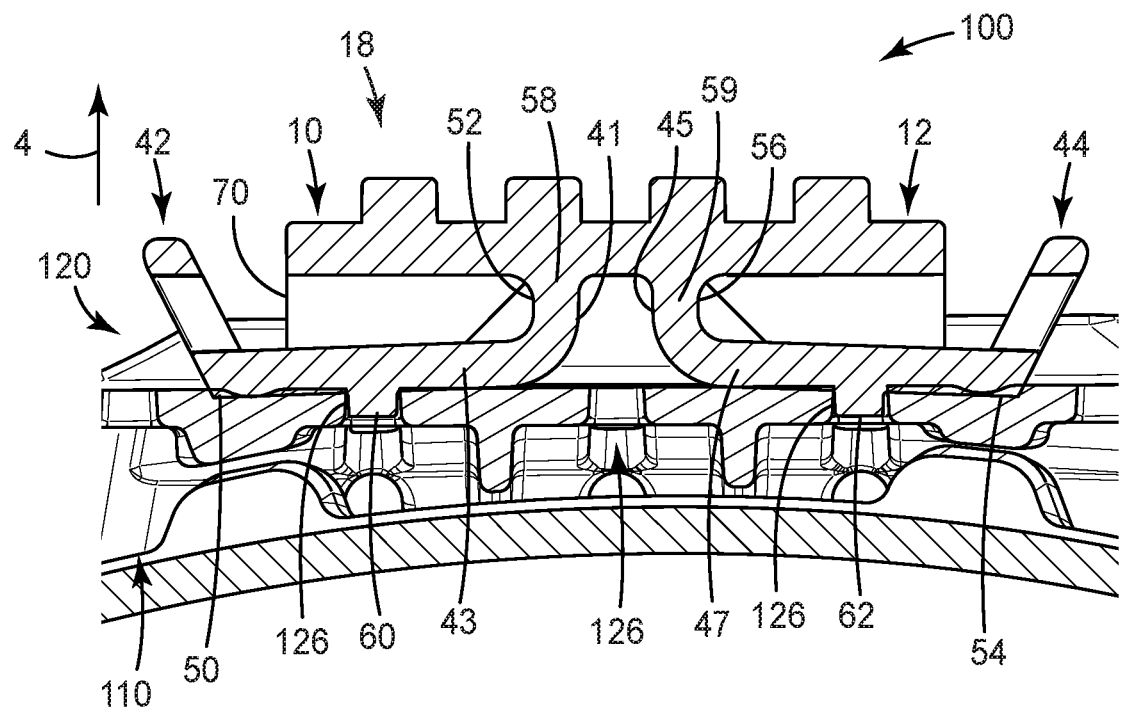
FIG. 6 is a schematic cross-section view of one embodiment of an accessory mounting system including the accessory mounting device of FIG. 1 connected to an elongated rail.

The levers 42, 44 are connected to the body 12 of device 10 at pivots 58, 59 respectively (FIG. 2). For example, lever 42 is connected to the body 12 at the first pivot 58, which is disposed at a second end 52 of the lever. Further, lever 44 is connected to the body 12 at the second pivot 59, which is disposed at a second end 56 of the second lever. The pivots 58, 59 can be any suitable pivot. In one or more embodiments, the pivots 58, 59 are integral with the body 12 and the levers 42, 44. In one or more embodiments, the pivots 58, 59 can be manufactured separately and attached to the body and to the levers 42, 44. Further, in one or more embodiments, the pivots 58, 59 can be living hinges that are formed between the levers 42, 44 and the body 12. For example, as can be seen in FIG. 6, which is a schematic side cross-section view of the accessory mounting system 100 that includes the device 10, the first lever 42 is connected to the body 12 of the device at the first pivot 58, where the pivot is a living hinge formed with the body. Further, the second lever 44 is connected to the body 12 of the device 10 at the second pivot 59, where the pivot is a living hinge formed with the body.

As mentioned herein, the levers 42, 44 can take any suitable shape or combination of shapes. As illustrated in FIG. 6, the first lever 42 includes a curved portion 41 at the second end 52 and a straight portion 43 that extends between the curved portion and the first end 50. The lever 44 also includes a curved portion 45 at the second end 56 and a straight portion 47 that extends between the curved portion and the first end 54. In one or more embodiments, the curved portions 41, 45 provide the living hinge along with the pivots 58, 59. Further, in one or more embodiments, the curved portions 41, 45 can provide a bias to the levers 42, 44 in a direction away from the top surface 18 of the body 12.

As mentioned herein, the levers 42, 44 can take any suitable shape or combination of shapes and have any suitable dimensions. For example, the first lever 42 can have a length such that the lever extends from the pivot 58 beyond the first end surface 14 of the body 12. In one or more embodiments, the first lever 42 has a length such that the actuation portion 46 is disposed adjacent the first end surface 14 of the body. As used herein, the phrase "adjacent the first end surface" means that an element or component is disposed closer to the first end surface of the body 12 than to the second end surface. Further, for example, the second lever 44 has a length such that the lever extends from the second pivot 59 beyond the second end surface 16 of the body 12. In one or more embodiments, the second lever 44 has a length such that the actuation portion 48 is disposed adjacent the second end surface 16 of the body 12. As used herein, the phrase "adjacent the second end surface" means that an element or component is disposed closer to the second end surface of the body than to the first end surface.

As mentioned herein, the locking mechanism 40 is adapted such that one or both levers 42, 44 can be rotated about pivot axes toward the top surface 18 of the body when the locking mechanism is manipulated from the locked position to the unlocked position. For example, the first lever 42 includes a pivot axis 6 that intersects the pivot 58 (FIG. 2). The pivot axis 6 can be oriented in any suitable position.

In one or more embodiments, the pivot axis 6 is substantially orthogonal to the body axis 2. As used herein, the phrase "substantially orthogonal" means that the pivot axis forms an angle with the body axis that is in a range of 85° to 95°. Further, the pivot axis 6 can be substantially parallel to the top surface 18. As used herein, the phrase "substantially parallel" means that an angle formed between a pivot axis and a surface is no greater than 10°. Further, the second lever 44 rotates about a pivot axis 8. The pivot axis 8 intersects the second pivot 59 and is substantially orthogonal to the body axis 2 and substantially parallel to the top surface 18. In one or more embodiments, the pivot axis 6 of the first lever 42 can be collinear with the pivot axis 8 of the second lever 44.

As mentioned herein, each of the levers 42, 44 can be disposed in any suitable position relative to the body 12 such that the levers are connected to the body by pivots 58, 59. As shown in FIG. 6, each of the levers 42, 44 is at least partially disposed within the recess 70. In one or more embodiments, one or both of the levers 42, 44 can be disposed entirely within the recess 70. Further, in one or more embodiments, only a portion of one or both of the levers 42, 44 can be disposed within the recess 70. As can be seen in FIG. 6, each of the levers 42, 44 is disposed at least partially within the recess 70 such that a portion of each of the levers extends outside of the recess along the bottom surface and side surfaces.

Disposed on the levers 42, 44 are tabs 60, 62. The tabs 60, 62 can be disposed in any suitable location on the levers 42, 44. As shown in FIG. 6, the tabs 60, 62 are disposed on the straight portions 43, 47 of the levers 42, 44. The tabs 60, 62 can take any suitable shape or combination of shapes. In one or more embodiments, one or both of the tabs 60, 62 can take an elongated shape that extends in a direction orthogonal to the body axis 2 between the first side surface 22 and the second side surface 24.

As mentioned herein, the levers 42, 44 can include any suitable material or combination materials. In one or more embodiments, one or both of the levers 42, 44 can include a resilient material such that the lever is biased in a direction away from the top surface 18 of the body 12. In one or more embodiments, at least one of the levers 42, 44 can be biased such that the locking mechanism 40 is biased in the locked position as shown in FIG. 3. When in the locked position, one or both of the tabs 60, 62 of the locking mechanism 40 extends a first distance 9 beyond the bottom surface 20 as measured in a direction orthogonal to the body axis 2. The tabs 60, 62 can extend the same distance 9 from the bottom surface 22 when the locking mechanism 40 is in the locked position or different distances. In contrast to FIG. 3, FIG. 4 is a schematic side view of the device 10 with the locking mechanism 40 in the unlocked position. When in the unlocked position, one or both of the tabs 60, 62 extend beyond the bottom surface 20 of the body 12 a second distance as measured in a direction orthogonal to the body axis 2. The second distance can be any suitable distance. In one or more embodiments, the second distance 11 can be 0. In other words, in one or more embodiments, one or both of the tabs 60, 62 do not extend beyond the bottom surface 20 of the body 12 when the locking mechanism 40 is in the unlocked position. When in the unlocked position, the tabs 60, 62 are withdrawn into the recess 70 such that the device 10 can slidably move along an elongated rail, thereby enabling a user to position the device in any suitable location along the rail as is further described herein.

The accessory mounting device 10 can be manufactured using any suitable technique or combination of techniques, e.g., injection molding, additive manufacturing (e.g., 3D printing such as fusion deposition modeling and stereo lithography), and subtractive manufacturing (e.g., machining) In one or more embodiments, the accessory mounting device 10 can be a unitary device such that the locking mechanism 40 is integral with the body 12. In one or more embodiments, the various elements of the accessory mounting device 10 can be manufactured separately and then assembled using any suitable technique or combination of techniques.

Figure 5:
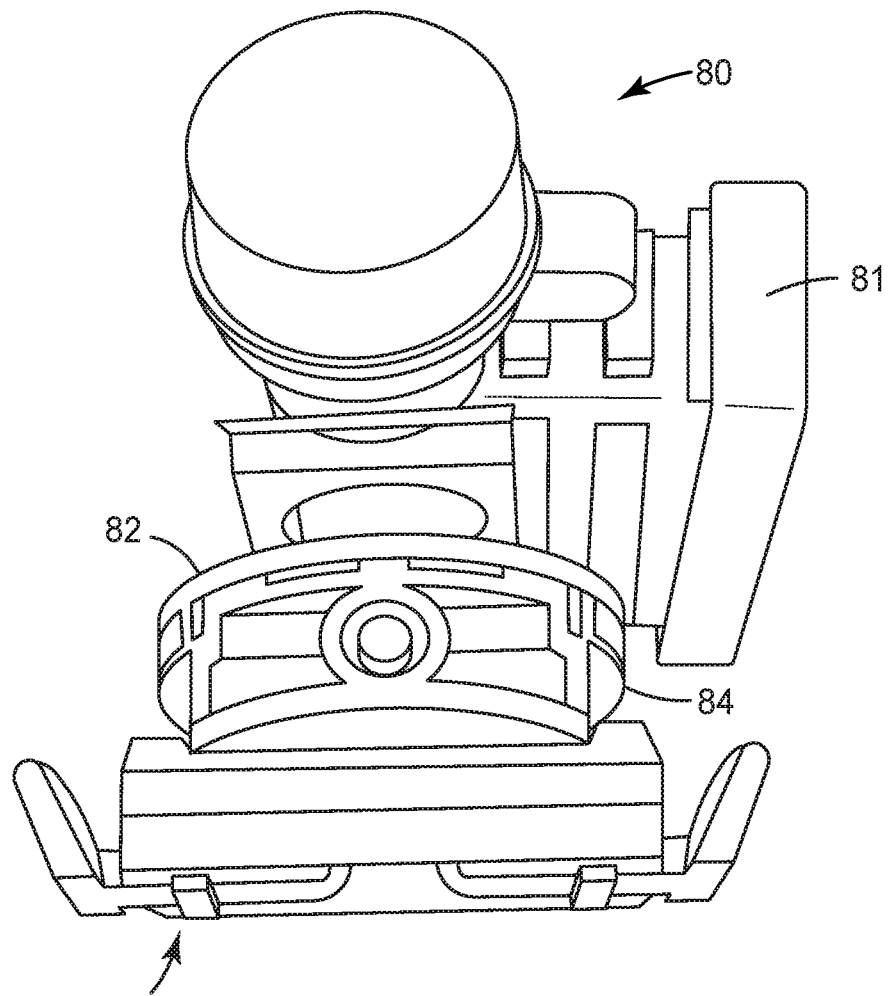
FIG. 5 is a schematic perspective view of one embodiment of an accessory connected to the accessory mounting device of FIG. 1.

One or more accessories can be connected to the accessory mounting device 10 using any suitable technique or combination of techniques. For example, FIG. 5 is a schematic perspective view of one embodiment of an accessory 80 connected to the accessory mounting device 10 of FIGS. 1-4. As illustrated, the accessory 80 is a flashlight 81. The accessory 80 is connected to an accessory mount 82 using any suitable technique or combination of techniques. In one or more embodiments, the accessory mount 82 is integral with the accessory 80. In one or more embodiments, the accessory mount 82 is separately manufactured and connected to the accessory 80 using any suitable technique or combination of techniques.

The accessory mount 82 includes a connection surface 84 that is adapted to connect with one or both of the top surface 18 and accessory engagement portions 34, 36 of the device 10. In one or more embodiments, the mount 82 is a Picatinny mount having a connection surface 84 that is adapted to connect the accessory 80 to a Picatinny rail, e.g., Picatinny rail formed by the top surface 18 and the accessory engagement portions 34, 36 of the device 10. The mount 82 of accessory 80 can be adapted to lock the accessory 80 into position relative to the device 10. In one or more embodiments, the mount 82 of accessory 80 can be adapted such that the position of the accessory in relation to the accessory mounting device 10 can be adjusted in any suitable direction. Although depicted as including one accessory 80, any suitable number of accessories can be connected to the device 10 at the same time.

Figure 8:
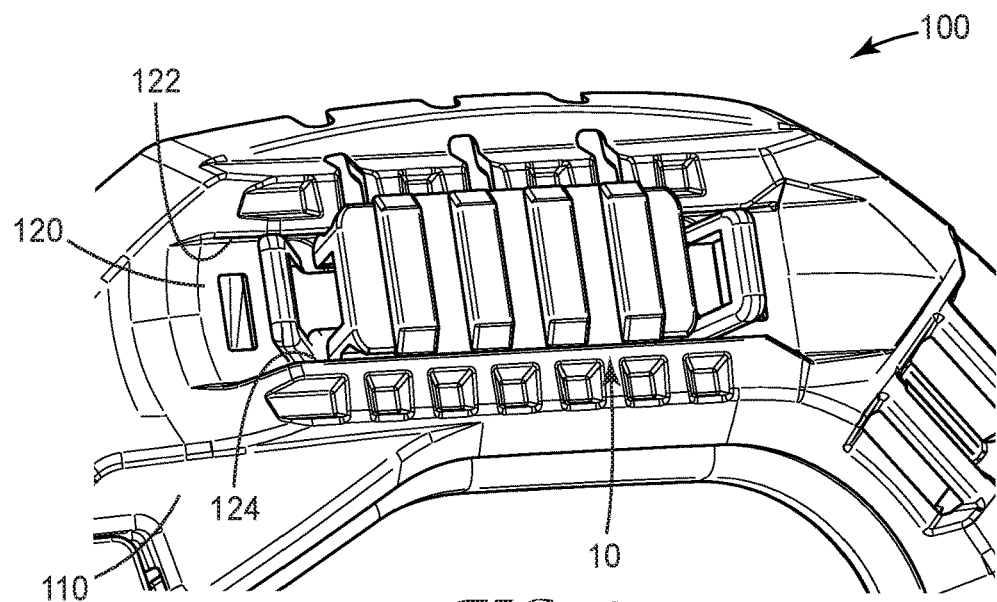
FIG. 8 is a schematic perspective view of the accessory mounting system of FIG. 6.

The accessory mounting devices described herein can be utilized with any suitable accessory mounting system. For example, FIGS. 6-8 are various views of one embodiment of an accessory mounting system 100 that includes the device 10 of FIGS. 1-4. The accessory mounting system 100 also includes the elongated rail 110. The elongated rail 110 can include a groove 120 disposed between first and second overhang portions 122, 124 as shown in FIG. 7. The elongated rail 110 can take any suitable shape or combination of shapes and include any suitable dimensions. Further, the elongated rail 110 can include any suitable material or combination of materials, e.g., the same materials described herein regarding the device 10.

The mounting device 10 can be connected to the elongated rail 110 using any suitable technique or combination of techniques. In one or more embodiments, the accessory mounting device 10 can be connected to the elongated rail 110 such that the device is slidably engaged with the groove 120 of the rail. In one or more embodiments, the rail engagement portion 30 of the first side surface 22 is adapted to engage the first overhang portion 122 of the rail 110. Further, in one or more embodiments, the rail engagement portion 32 of the second side surface 24 of the device 10 is adapted to engage the second overhang portion 124 of the elongated rail 110. In one or more embodiments, the rail engagement portions 30, 32 of the device 10 can form a reverse dovetail connection with the overhang portions 122, 124 of the rail 110.

As shown in FIG. 6, the elongated rail 110 can also include one or more slots 126 disposed within the groove 120. Although depicted as including four slots, the elongated rail 110 can include any suitable number of slots, e.g., one, two, three, four, five, six, or more slots. The slots 126 can be disposed at any suitable distance between slots such that the device 10 can be slidably manipulated by the user and locked into place in any suitable location along the rail 110. In one or more embodiments, a center-to-center distance between slots 126 is the same as a center-to-center distance between tabs 60, 62. The slots 126 can take any suitable shape or combination of shapes and have any suitable dimensions. The one or more slots 126 can be adapted to receive one or more of the tabs 60, 62 of locking mechanism 40 of device 10. The tabs 60, 62 can engage one or more of the slots 126 when the locking mechanism 40 is in the locked position as illustrated in FIG. 3. Further, one or more of the tabs 60, 62 of the locking mechanism 40 can be disengaged from one or more of the slots 126 of the elongated rail 110 when the locking mechanism is in the unlocked position as shown in FIG. 4.

In embodiments where one or both of the levers 42, 44 include a resilient material that biases the levers in a direction away from the top surface 18, one or both of the levers can provide an upward force to the body 12 in a direction 4 by pressing against the groove 120. This upward force in the direction 4 can cause the rail engagement portions 30, 32 of the first and second side services 22, 24 to be biased against the first and second overhang portions 122, 124 of the elongated rail 110 when the device 12 is engaged with the elongated rail. Further, this force provided by one or both of the levers 42, 44 can help lock the device 10 in place when the locking mechanism 40 is in the locked position, i.e., when one or both of the tabs 60, 62 are engaged with slots 126.

A user can slide the device 10 into the groove 120 of the elongated rail 110 from either end of the groove. In one or more embodiments, the rail 110 can include a bumper or stop at one end of the groove 120 such that the accessory mounting device 10 can only be connected to the rail from one end of the groove 120 while preventing the device from being disengaged from the rail by sliding the device beyond the second end of the groove. In one or more embodiments, one or both of the rail 110 and the device 10 can include indicia or notches that indicate a preferred location for a particular accessory or combination of accessories such that the user can position the accessory in a desired location along the rail without the need to visually confirm that the accessory is positioned in the desired location. The user can slide the device 10 along the groove 120 until the locking mechanism 40 engages one or more slots 126 disposed within the groove. When one or both of the tabs 60, 62 engages one or more slots 126, the device 10 is fixed or locked in place in relation to the elongated rail 110 such that the device cannot slidably move along the groove 120 of the rail. In one or more embodiments, when the locking mechanism 40 of the device 10 is in the unlocked position (FIG. 4), the device 10 slides along the groove 120 of the elongated rail 110 in a direction substantially parallel to the body axis 2.

To adjust the position of the device 10 relative to the elongated rail 110, the user can grasp the levers 42, 44 with a single hand and manipulate the locking mechanism 40 from the locked position to the unlocked position by applying a force to each lever towards the body 12 such that the levers rotate about pivot axes 6, 8, thereby releasing one or both tabs 60, 62 from slots 126 of the elongated rail 110. A user can manipulate one or both levers 42, 44 simultaneously or sequentially. In one or more embodiments, both levers 42, 44 are rotated about pivot axes 6, 8 toward the top surface 18 of the device 10 such that the locking mechanism 40 is in the unlocked position (FIG. 4). The user can then adjust the position of the device 10 relative to the elongated rail by sliding the device along the groove 120 of the rail 110. Once the device 10 is in the desired location relative to the elongated rail 110, the user can release the levers 42, 44 such that the tabs 60, 62 can engage with slots 126.

If the user releases the levers 42, 44 when the device 10 is disposed in a position relative to the elongated rail 110 where the tabs 60, 62 do not coincide with slots 126, the device remains free to slide in the groove 120 until such time as the biasing force applied by the levers 42, 44 causes the tabs 60, 62 to engage with slots 126 when the device is disposed such that the tabs are coincident with the slots in a direction orthogonal to the body axis 2. At that point, the locking mechanism 40 has been manipulated from the unlocked position to the locked position, thereby locking the device 10 into position relative to the elongated rail 110.

The user can attach an accessory to the device 10 (e.g., accessory 80 of FIG. 5) using any suitable technique or combination of techniques once the device 10 is disposed in the desired position relative to the elongated rail 110. In one or more embodiments, the user can first attach an accessory to the accessory mounting device 10 before connecting the device to the elongated rail 110. The user can then slide the device 10 having the accessory mounted thereon into the groove 120 of the elongated rail 110 and position the accessory in any desired location along the groove. As mentioned herein, the device 10 along with the accessory can be readjusted along the elongated rail 110 without the need for additional tools and when the helmet or head gear is still being worn by the user. In other words, the user does not need to remove the helmet before adjusting the position of the accessory along the elongated rail 110 as the device 10 can be adjusted by a single hand and without the use of additional tools.

Figure 9:
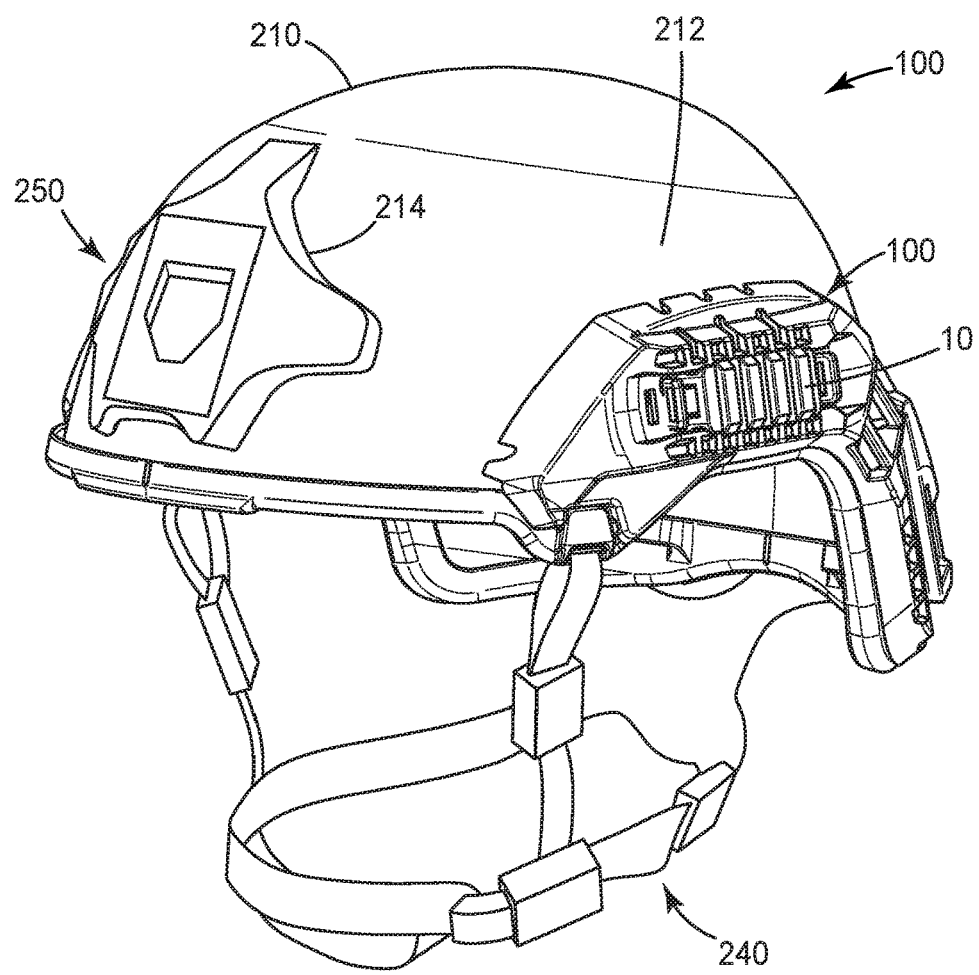
FIG. 9 is a schematic perspective view of one embodiment of a helmet that includes the accessory mounting system of FIG. 6.

The accessory mounting systems and devices described herein can be utilized with any suitable helmet or head gear. For example, FIG. 9 is a schematic perspective view of one embodiment of a helmet 200 that includes a helmet body 210. The helmet 200 also includes the accessory mounting system 100 of FIGS. 6-8 disposed on a left portion 212 of the helmet body 210. The helmet 200 also includes chin strap 240 and a second accessory mounting system 250 disposed on a front portion 214 of the helmet body 210. Although depicted as including the rail accessory mounting system 100, the helmet 200 can include any suitable accessory mounting device or system.

In the embodiment illustrated in FIG. 9, the accessory mounting system 100 is disposed on the left portion 212 of the helmet body 210. The accessory mounting system 100 can be disposed on the helmet body 210 using any suitable technique or combination of techniques. In one or more embodiments, the accessory mounting system 100 can be disposed on any suitable portion of the helmet body 210. Further, in one or more embodiments, any suitable number of additional accessory mounting systems can be disposed on the helmet body 210 at one time.

Any suitable accessory or accessories can be connected to the accessory mounting system 100 using any suitable technique or combination of techniques. Further, two or more accessories can be connected to the accessory mounting system 100 using the same accessory mounting device 10, i.e., two or more accessories can be connected to a single accessory mounting device 10. In one or more embodiments, two or more accessory mounting devices 10 can be connected to the same elongated rail 110 at the same time. Further, the additional accessory mounting system 250 can include any suitable accessory mounting system or systems, e.g., accessory mounting system 100 of FIGS. 6-8.

Figure 10:
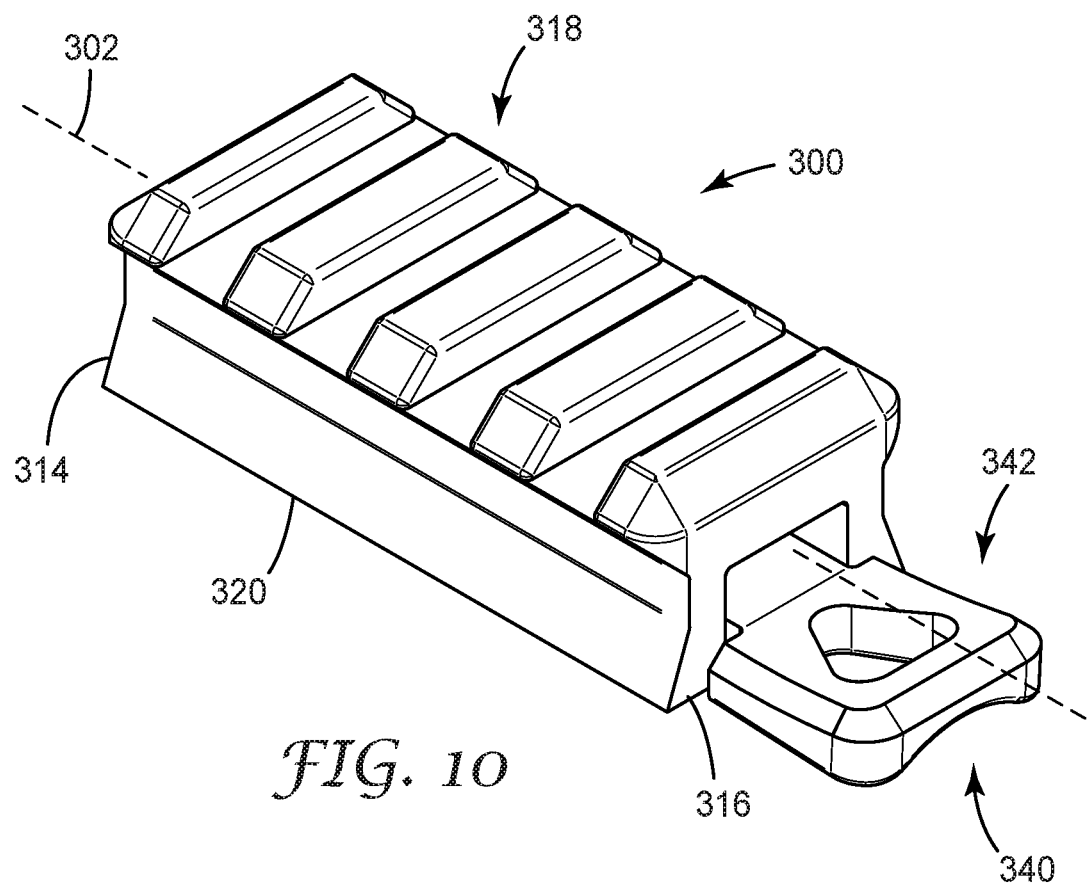
FIG. 10 is a schematic perspective view of another embodiment of an accessory mounting device.
Figure 11:
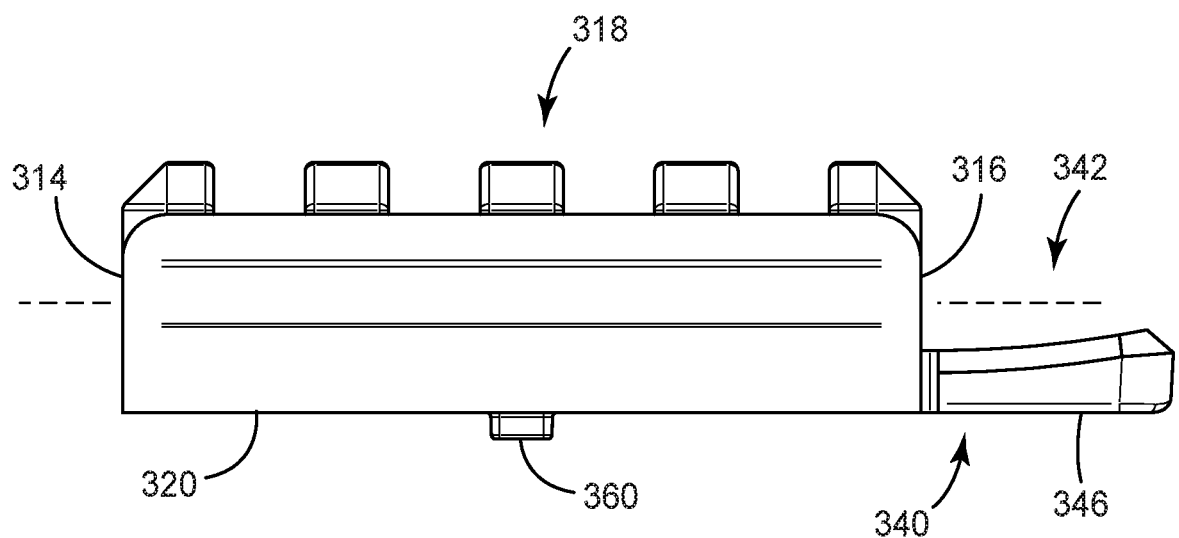
FIG. 11 is a schematic side view of the accessory mounting device of FIG. 10.
Figure 12:
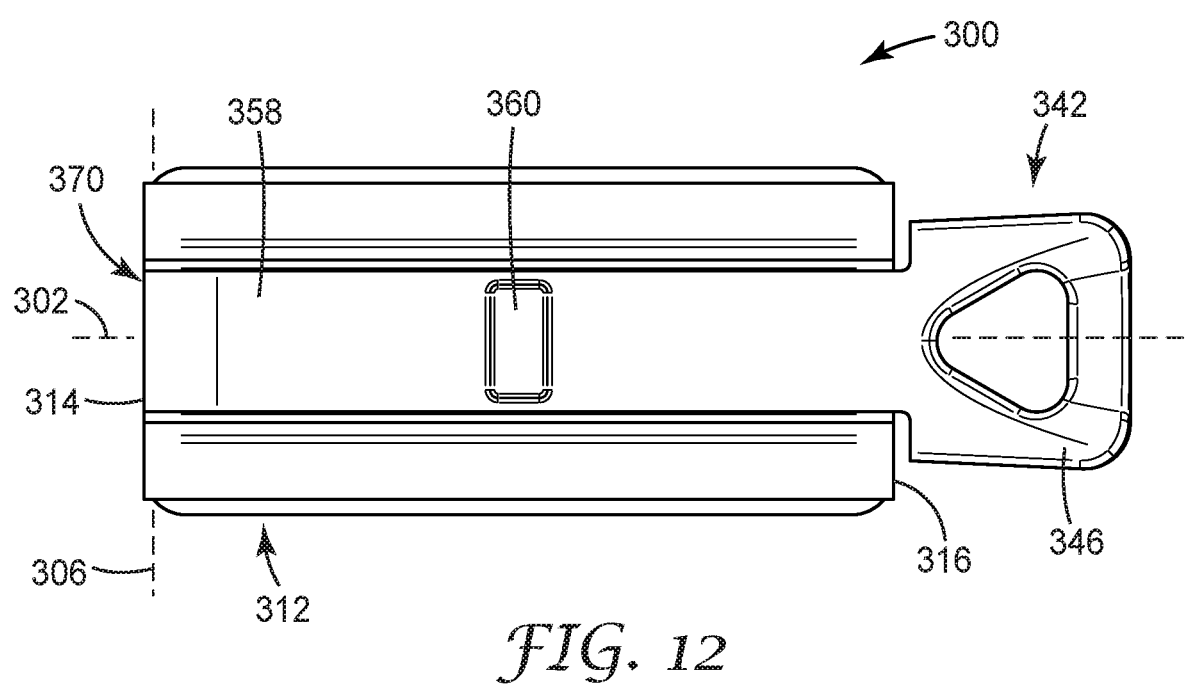
FIG. 12 is a schematic bottom plan view of the accessory mounting device of FIG. 10.

As mentioned herein, the locking mechanism of the accessory mounting devices described herein can include any suitable number of levers. For example, FIGS. 10-12 are various views of another embodiment of an accessory mounting device 300. All of the design considerations and possibilities regarding the accessory mounting device 10 of FIGS. 1-3 apply equally to the accessory mounting device 300 of FIGS. 10-12. One difference between the accessory mounting device 300 of FIGS. 10-12 and accessory mounting device 10 is that locking mechanism 340 includes a single lever 342. The lever 342 extends between a pivot 358 disposed adjacent a first end surface 314 to a second end surface 316 and beyond the body 312. The lever 342 includes an actuation portion 346 that is adapted to be engaged by a user such that the user can apply an upward force to the lever in a direction toward the top surface 318 to manipulate the locking mechanism 340 from a locked position to an unlocked position. Although the pivot 358 is disposed adjacent the first end surface 314 of the body 312, the pivot can be disposed in any suitable location in relation to the body.

A user can insert the accessory mounting device 300 into an elongated rail (e.g., elongated rail 110 of FIGS. 6-8), and position the device in a suitable location in relation to the elongated rail. Tab 360 of locking mechanism 340 can engage a slot or slots (e.g., slots 126 of elongated rail 110) such that the locking mechanism is in a locked position and the device 10 is locked into position relative the elongated rail. To manipulate the locking mechanism 340 from the locked position to the unlocked position, the user can engage the actuation portion 346 of lever 242 with a finger or thumb while grasping the body 312 of the device in a suitable location with one or more additional fingers, and provide an upward force to the lever such that the lever pivots about a pivot axis 306 that intersects the pivot 358 and is substantially orthogonal to the body axis 302 and substantially parallel to the top surface 318. As the user rotates the lever 342 about the pivot axis 306, the tab 360 disengages from the slot of the elongated rail such that the device 300 can slidably move along the elongated rail to a desired position. Once in the desired position, the user can release the lever 342 such that the tab 360 can engage the slot of the elongated rail, thereby locking the device 300 into the desired position.

Exemplary embodiment include the following:

Embodiment 1. An accessory mounting device adapted to engage an elongated rail, the accessory mounting device comprising:

a body extending along a body axis between first and second end surfaces, wherein the body further comprises a top surface, a bottom surface, and first and second side surfaces each extending between the top and bottom surfaces and along the body axis, wherein the top surface comprises two ridges separated by a slot, and wherein each of the first and second side surfaces comprises a rail engagement portion adjacent the bottom surface and extending along the body axis, and further wherein each of the first and second side surfaces further comprises an accessory engagement portion adjacent the top surface and extending along the body axis; and a locking mechanism comprising a resilient lever connected to the body at a pivot and a tab extending from the lever in a direction away from the bottom surface of the body, wherein the lever comprises an actuation portion disposed adjacent the first end surface of the body, wherein the lever rotates about a pivot axis that intersects the pivot and is substantially orthogonal to the body axis and substantially parallel to the top surface, wherein the lever is biased in a direction away from the top surface and rotates toward the top surface when the locking mechanism is manipulated from a locked position to an unlocked position.

Embodiment 2. The device of embodiment 1, wherein the pivot is disposed within a recess formed in the bottom surface of the body that extends along the body axis between the first and second side surfaces, wherein the resilient lever is at least partially disposed within the recess.

Embodiment 3. The device of any one of embodiments 1-2, wherein the resilient lever biases the locking mechanism in the locked position.

Embodiment 4. The device of any one of embodiments 1-3, wherein the pivot is disposed adjacent the second end surface of the body, and further wherein the resilient lever extends from the pivot beyond the first end surface of the body.

Embodiment 5. The device of any one of embodiments 1-4, wherein the top surface and accessory engagement portions of the first and second side surfaces combine to form a Picatinny rail.

Embodiment 6. The device of any one of embodiments 1-5, wherein the tab of the locking mechanism extends a first distance from the bottom surface of the body as measured in a direction orthogonal to the body axis when the locking mechanism is in the locked position, and wherein the tab extends a second distance from the bottom surface as measured in a direction orthogonal to the body axis when the locking mechanism is in the unlocked position, wherein the first distance is greater than the second distance.

Embodiment 7. The device of any one of embodiments 1-6, wherein the locking mechanism is adapted to be manipulated from the locked position to the unlocked position by a single hand of a user.

Embodiment 8. An accessory mounting system comprising the accessory mounting device of any one of embodiments 1-7 and an elongated rail, wherein the elongated rail comprises a groove disposed between first and second overhang portions, wherein the rail engagement portions of the first and second side surfaces of the body of the accessory mounting device engage the first and second overhang portions of the elongated rail such that the accessory mounting device is slidably connected to the elongated rail, wherein the accessory mounting device is adapted to slide along the groove of the elongated rail in a direction substantially parallel to the body axis of the body of the accessory mounting device.

Embodiment 9. The system of embodiment 8, wherein the resilient lever of the accessory mounting device engages the groove of the elongated rail and provides an upward force to the device such that the rail engagement portion of the first and second side surfaces is biased against the first and second overhang portions of the elongated rail when the device is connected to the elongated rail.

Embodiment 10. The system of any one of embodiments 8-9, wherein the elongated rail further comprises a slot disposed within the groove, wherein the tab of the locking mechanism of the accessory mounting device is adapted to engage the slot when the locking mechanism is in the locked position.

Embodiment 11. The system of embodiment 10, wherein the tab of the locking mechanism is disengaged from the slot of the elongated rail when the locking mechanism is in the unlocked position.

Embodiment 12. The system of any one of embodiments 8-11, further comprising an accessory releasably connected to the accessory mounting device.

Embodiment 13. The system of embodiment 12, wherein the accessory comprises a flashlight.

Embodiment 14. The system of embodiment 12, wherein the accessory comprises a camera.

Embodiment 15. The system of embodiment 12, wherein the accessory comprises a night vision apparatus.

Embodiment 16. The system of embodiment 12, wherein the accessory comprises a gun sight.

Embodiment 17. A helmet comprising the accessory mounting system of any one of embodiments 8-16.

Embodiment 18. An accessory mounting device adapted to engage an elongated rail, the accessory mounting device comprising:

a body extending along a body axis between first and second end surfaces, wherein the body further comprises a top surface, a bottom surface, and first and second side surfaces each extending between the top and bottom surfaces and along the body axis, wherein each of the first and second side surfaces comprises a rail engagement portion adjacent the bottom surface and extending along the body axis, and further wherein each of the first and second side surfaces further comprises an accessory engagement portion adjacent the top surface and extending along the body axis, wherein at least the top surface is adapted to be connected to an accessory; and a locking mechanism comprising first and second levers connected to the body at first and second pivots, a first tab extending from the first lever in a direction away from the bottom surface of the body, and a second tab extending from the second lever in a direction away from the bottom surface of the body, wherein the first lever extends from the first pivot beyond the first end surface of the body, wherein the second lever extends from the second pivot beyond the second end surface of the body, wherein each of the first and second levers rotates about a pivot axis that intersects the first and second pivots respectively and is substantially orthogonal to the body axis and substantially parallel to the top surface, wherein each of the first and second levers rotates toward the top surface of the body when the locking mechanism is manipulated from a locked position to an unlocked position.

Embodiment 19. The device of embodiment 18, wherein the pivot axis of the first lever and the pivot axis of the second lever are collinear.

Embodiment 20. The device of any one of embodiments 18-19, wherein the locking mechanism is manipulated from the locked position to the unlocked position by simultaneously rotating the first lever and the second lever in a direction toward the top surface of the body.

Embodiment 21. The device of any one of embodiments 18-20, wherein the locking mechanism is adapted to be manipulated from the locked position to the unlocked position by a single hand of a user.

Embodiment 22. The device of claim any one of embodiments 18-21, wherein the first and second pivots are disposed within a recess formed in the bottom surface of the body that extends along the body axis between the first and second side surfaces, wherein the each of the first and second levers is at least partially disposed within the recess.

Embodiment 23. The device of any one of embodiments 18-22, wherein each of the first and second levers comprises a resilient lever that biases the locking mechanism in the locked position.

Embodiment 24. The device of any one of embodiments 18-23, wherein the top surface and accessory engagement portions of the first and second side surfaces combine to form a Picatinny rail.

Embodiment 25. The device of any one of embodiments 18-24, wherein each of the first and second tabs of the locking mechanism extends a first distance from the bottom surface of the body as measured in a direction orthogonal to the body axis when the locking mechanism is in the locked position, and wherein each of the first and second tabs extends a second distance from the bottom surface as measured in a direction orthogonal to the body axis when the locking mechanism is in the unlocked position, wherein the first distance is greater than the second distance.

Embodiment 26. An accessory mounting system comprising the accessory mounting device of any one of embodiments 18-25 and an elongated rail, wherein the elongated rail comprises a groove disposed between first and second overhang portions, wherein the rail engagement portions of the first and second side surfaces of the body of the accessory mounting device engage the first and second overhang portions of the elongated rail such that the accessory mounting device is slidably connected to the elongated rail, wherein the accessory mounting device is adapted to slide along the groove of the elongated rail in a direction substantially parallel to the body axis of the body of the accessory mounting device.

Embodiment 27. The system of embodiment 26, wherein the first and second levers of the accessory mounting device engage the groove of the elongated rail and provide an upward force to the device such that the rail engagement portion of the first and second side surfaces is biased against the first and second overhang portions of the elongated rail when the device is connected to the elongated rail.

Embodiment 28. The system of any one of embodiments 26-27, wherein the elongated rail further comprises a slot disposed within the groove, wherein at least one of the first and second tabs of the locking mechanism of the accessory mounting device is adapted to engage the slot when the locking mechanism is in the locked position.

Embodiment 29. The system of embodiment 28, wherein at least one of the first and second tabs of the locking mechanism is disengaged from the slot of the elongated rail when the locking mechanism is in the unlocked position.

Embodiment 30. A helmet comprising the accessory mounting system of any one of embodiments 26-29.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. An accessory mounting system comprising an accessory mounting device engaging an elongated rail, the accessory mounting device comprising:

a body extending along a body axis between first and second end surfaces, wherein the body further comprises a top surface, a bottom surface, and first and second side surfaces each extending between the top and bottom surfaces and along the body axis, wherein the top surface comprises two ridges separated by a top slot, and wherein each of the first and second side surfaces comprises a rail engagement portion adjacent the bottom surface and extending along the body axis, and further wherein each of the first and second side surfaces further comprises an accessory engagement portion adjacent the top surface and extending along the body axis; and a locking mechanism comprising a first resilient lever connected to the body at a first pivot and a first tab extending from the first lever in a direction away from the bottom surface of the body, wherein the first lever comprises a first actuation portion disposed adjacent the first end surface of the body, wherein the first lever rotates about a first pivot axis that intersects the first pivot and is substantially orthogonal to the body axis and substantially parallel to the top surface, wherein the first lever is biased in a direction away from the top surface and rotates toward the top surface when the kicking mechanism is manipulated from a locked position to an unlocked position, and wherein the first resilient lever biases the locking mechanism in the locked position;

the elongated rail comprising:

a groove disposed between first and second overhang portions, wherein the rail engagement portions of the first and second side surfaces of the body of the accessory mounting device engage the first and second overhang portions of the elongated rail such that the accessory mounting device is slidably connected to the elongated ran, wherein the accessory mounting device is adapted to slide along the groove of the elongated rail in a direction substantially parallel to the body axis of the body of the accessory mounting device, wherein the first resilient lever of the accessory mounting device engages the groove of the elongated rail and provides an upward force to the device such that the rail engagement portion of the first and second side surfaces is biased against the first and second overhang portions of the elongated rail when the device is connected to the elongated rail; and a slot disposed within the groove, wherein the first tab of the locking mechanism of the accessory mounting device is adapted to engage the slot when the locking mechanism is in the locked position.

2. The accessory mounting system of claim 1, wherein the first pivot is disposed within a recess formed in the bottom surface of the body that extends along the body axis between the first and second side surfaces, wherein the first resilient lever is at least partially disposed within the recess.

3. The accessory mounting system of claim 1, wherein the first pivot is disposed adjacent the second end surface of the body, and further wherein the first resilient lever extends from the first pivot beyond the first end surface of the body.

4. The accessory mounting system of claim 1, wherein the top surface and accessory engagement portions of the first and second side surfaces combine to form a Picatinny rail.

5. The accessory mounting system of claim 1, wherein the locking mechanism is adapted to be manipulated from the locked position to the unlocked position by a single hand of a user.

6. The accessory mounting system of claim 1, further comprising an accessory releasably connected to the accessory mounting device.

7. The accessory mounting system of claim 6, wherein the accessory is selected from the group consisting of a flashlight, a camera, a night vision apparatus, and a gun sight.

8. A helmet comprising the accessory mounting system of claim 1.

9. The accessory mounting system of claim 1, wherein the locking mechanism further comprises a second resilient lever connected to the body at a second pivot, a second tab extending from the second lever in a direction away from the bottom surface of the body, wherein the second lever extends from the second pivot beyond the second end surface of the body, wherein the second lever rotates about a second pivot axis that intersects the second pivot and is substantially orthogonal to the body axis and substantially parallel to the top surface, wherein each of the first and second levers rotates toward the top surface of the body when the locking mechanism is manipulated from a locked position to an unlocked position, wherein the first and second levers engage the groove of the elongated rail and provide an upward force to the device such that the rail engagement portion of the first and second side surfaces is biased against the first and second overhang portions of the elongated rail when the device is connected to the elongated ran, wherein the second lever bases the locking mechanism in the locked position, and wherein the second tab is adapted to engage a second slot in the groove when the locking mechanism is in the locked position.

10. The accessory mounting system of claim 9, wherein the locking mechanism is manipulated from the locked position to the unlocked position by simultaneously rotating the first lever and the second lever in a direction toward the top surface of the body.

11. The accessory mounting system of claim 9, wherein the locking mechanism is adapted to be manipulated from the locked position to the unlocked position by a single hand of a user.

12. The accessory mounting system of claim 9, wherein the top surface and accessory engagement portions of the first and second side surfaces combine to form a Picatinny rail.

13. The accessory mounting system of claim 9, wherein at least one of the first and second tabs of the locking mechanism is disengaged from the slot of the elongated rail when the locking mechanism is in the unlocked position.

14. A helmet comprising the accessory mounting system of claim 9.

* * * * *

UNITED STATES PATENT AND TRADEMARK OFFICE
CERTIFICATE OF CORRECTION

PATENT NO. : 11,150,055 B2  
APPLICATION NO. : 15/767051  
DATED : October 19, 2021  
INVENTOR(S) : Thomas R. Gehring et al.

Page 1 of 1

It is certified that error appears in the above-identified patent and that said Letters Patent is hereby corrected as shown below:

In the Claims

Column 17, Line 22, Claim 1 should read:
-- ...wherein the first lever is biased in a direction away from the top surface and rotates toward the top surface when the locking mechanism is manipulated from a locked position to an unlocked position, ...a groove disposed between first and second overhang portions, wherein the rail engagement portions of the first and second side surfaces of the body of the accessory mounting device engage the first and second overhang portions of the elongated rail such that the accessory mounting device is slidably connected to the elongated rail, --

Column 18, Line 36, Claim 9 should read:
-- ...wherein the second lever biases the locking mechanism in the locked position, --

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*